United States Patent [19]

Price et al.

[11] Patent Number: 4,614,072
[45] Date of Patent: Sep. 30, 1986

[54] DROP-CEILING SUPPORT SYSTEM

[75] Inventors: Edison A. Price, New York; Fulgencio V. Bengochea, East Meadow, both of N.Y.

[73] Assignee: Edison Price, Inc., New York, N.Y.

[21] Appl. No.: 759,121

[22] Filed: Jul. 25, 1985

[51] Int. Cl.[4] .............................. E04B 5/52; E04C 3/32
[52] U.S. Cl. ........................................ 52/484; 52/475; 52/488; 411/433; 411/437
[58] Field of Search ......................... 52/475, 484, 488; 411/432–434, 437; 248/59, 327

[56] References Cited

U.S. PATENT DOCUMENTS

| | | | |
|---|---|---|---|
| 766,890 | 8/1904 | Newberg | 411/433 X |
| 2,689,630 | 9/1954 | Drury | 52/475 |
| 3,708,941 | 1/1973 | Cuckson | 52/484 |
| 3,911,638 | 10/1975 | Englund et al. | 52/484 X |
| 4,083,522 | 4/1978 | Vandersip | 248/59 X |

FOREIGN PATENT DOCUMENTS

| | | | |
|---|---|---|---|
| 451010 | 9/1948 | Canada | 411/437 |
| 2242658 | 3/1974 | Fed. Rep. of Germany | 52/484 |
| 203204 | 3/1966 | Sweden | 411/516 |
| 952756 | 3/1964 | United Kingdom | 52/488 |

*Primary Examiner*—Alfred C. Perham
*Attorney, Agent, or Firm*—Brumbaugh, Graves, Donohue & Raymond

[57] ABSTRACT

An improved drop-ceiling support system for supporting ceiling tiles and lighting fixtures comprises hanger members attached to and extending downwardly from an original ceiling and arranged at aligned intervals along parallel rows, inverted U-shaped carrier channel members adjoined end-to-end in parallel rows and attached to the hanger members, and main runner members adjoined end-to-end in parallel rows transverse to the rows of carrier channel members and snap-fitted beneath and into the carrier channel members.

9 Claims, 20 Drawing Figures

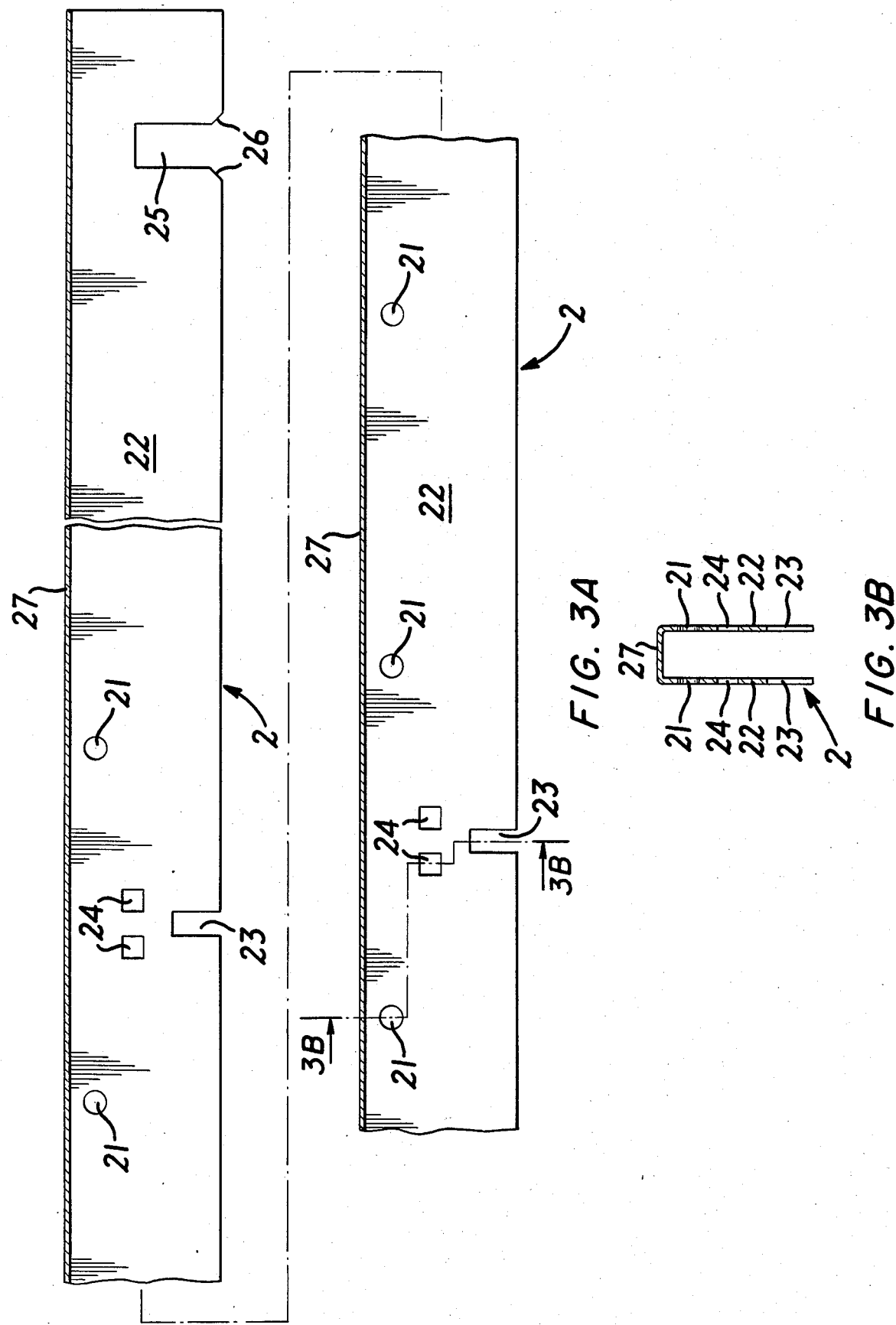

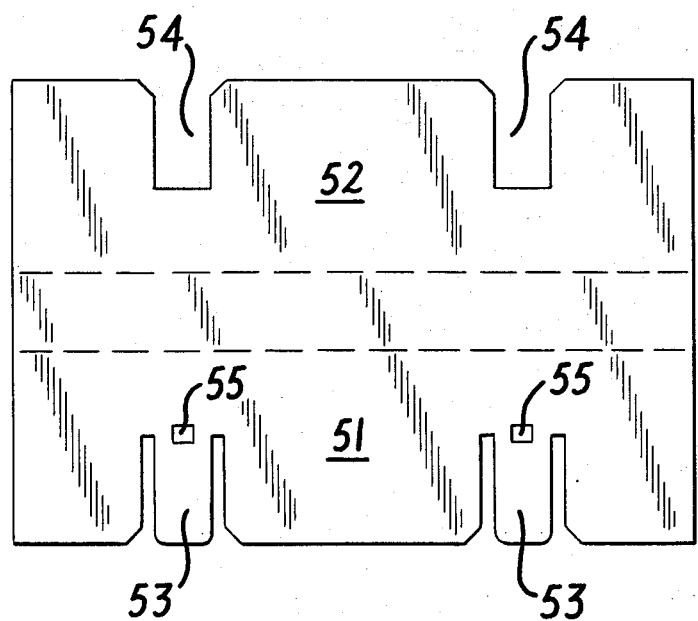
FIG. 5A
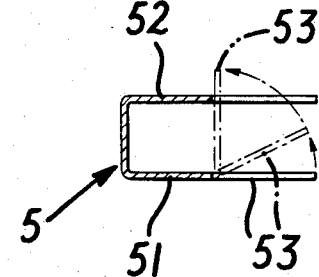
FIG. 5B
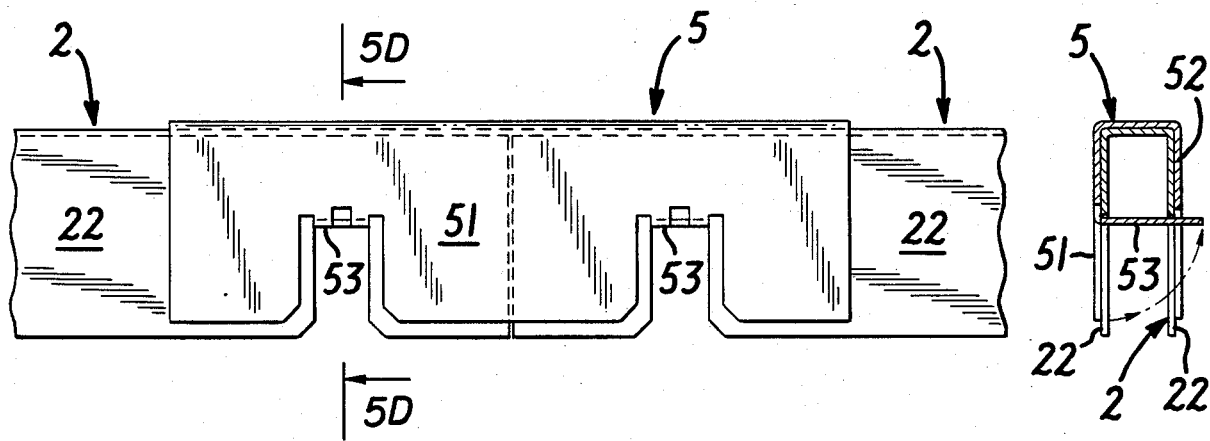
FIG. 5C
FIG. 5D

DROP-CEILING SUPPORT SYSTEM

BACKGROUND OF THE INVENTION

The present invention relates to a drop-ceiling support system for supporting ceiling tiles and lighting fixtures.

In the past, ceiling supporting systems have generally been of two types.

(1) Systems with continuous main support members in one direction and discontinuous cross members in the perpendicular direction and in most cases with both types of members lying within the same horizontal plane. Because of the discontinuity in one direction, this type of ceiling support system lacks inherent rigidity and requires more parts and more connections at joints.

(2) Systems with continuous members in both directions. These systems usually result in a reduced number of parts and simpler connections at perpendicular joints, and in a more rigid construction. However, these systems require the use of spacers or installation jigs to assure exact spacings between support members.

The heretofore known drop-ceiling support systems suffer from a number of disadvantages. They are difficult and time-consuming to install and accuracy of spacing may be poorly maintained over large expanses of ceiling. Support system designs that provide ready access into the plenum above usually do so at the expense of a cluttered appearance with too much of the support system being visible from below. Another problem is that supports that pass alongside recessed fluorescent lighting fixtures often intrude into the area that should be kept clear in order to realize minimum interference with the flow of room supply air furnished by air supply boots attached to the fixtures.

SUMMARY OF THE INVENTION

Accordingly, it is an object of the present invention to provide an improved drop-ceiling support system which can be easily, rapidly and inexpensively installed by hand without the need for special tools; which maintains accurate spacing over long distances without requiring measurements or installation jigs; which is unobtrusive in appearance from below; and which does not intrude into the area alongside the lighting fixture that should be kept clear to maximize air delivery from a fixture-attached air boot.

The ceiling support system of the present invention falls into the above type (2), since it uses continuous members in both directions, but by making these members interpenetrate, the spacing between main runners is established automatically without the need for spacers or jigs and the resulting grid is inherently rigid.

In accordance with the present invention, there is provided a drop-ceiling support system for supporting ceiling tiles and lighting fixtures which comprises hanger members attached to and extending downwardly from an original ceiling and arranged at aligned intervals along parallel rows, inverted U-shaped carrier channel members adjoined end-to-end in parallel rows and attached to the hanger members, and main runner members adjoined end-to-end in parallel rows transverse to the rows of carrier channel members and snap-fitted beneath and into the carrier channel members. A further feature of the present invention is the use of latch springs which are housed within the carrier channel members so that the main runner members can be easily and rapidly snap-fitted beneath and into the carrier channel members. Another feature of the present invention is the use of latch springs which are themselves snap-fitted into the carrier channel members for easy and rapid hand installation therein. A further feature of the present invention is that the snap-fitting of the main runner members into the latch springs and the snap-fitting of the latch springs into the carrier channel members shall make strong and reliable connections which will support the maximum loads that may be encountered with an ample margin of safety. A still further feature of the present invention is the use of coupler members for joining together the ends of abutting carrier channel members so as to provide rigidity or strength in all directions. Yet another feature of the present invention is the use of splice members for joining together the ends of abutting main runner members so as to provide rigidity or strength in all directions. Still another feature of the present invention is the use of hanger clips for holding the carrier channel members which provide ease of attachment of the support system to the original ceiling and further provide rigidity or strength in all directions.

DESCRIPTION OF DRAWINGS

In the non-scalar drawings:

FIG. 3A is a side view of the carrier channel, while FIG. 3B is an end view of the carrier channel taken on line 3B—3B in FIG. 3A;

FIG. 4B is an end view of the latch spring taken on line 4B—4B of FIG. 4A, while

FIGS. 5A and 5B are a developed view and an end view, respectively, of the channel carrier coupler, while FIGS. 5C and 5D are a side view and an end view (taken on line 5D—5D of FIG. 5C), respectively, of two coupled channel carriers;

FIGS. 7A and 7B are a side view and an end view, respectively, of a carrier channel hanger clip, while

DETAILED DESCRIPTION OF THE INVENTION

Figure 1:
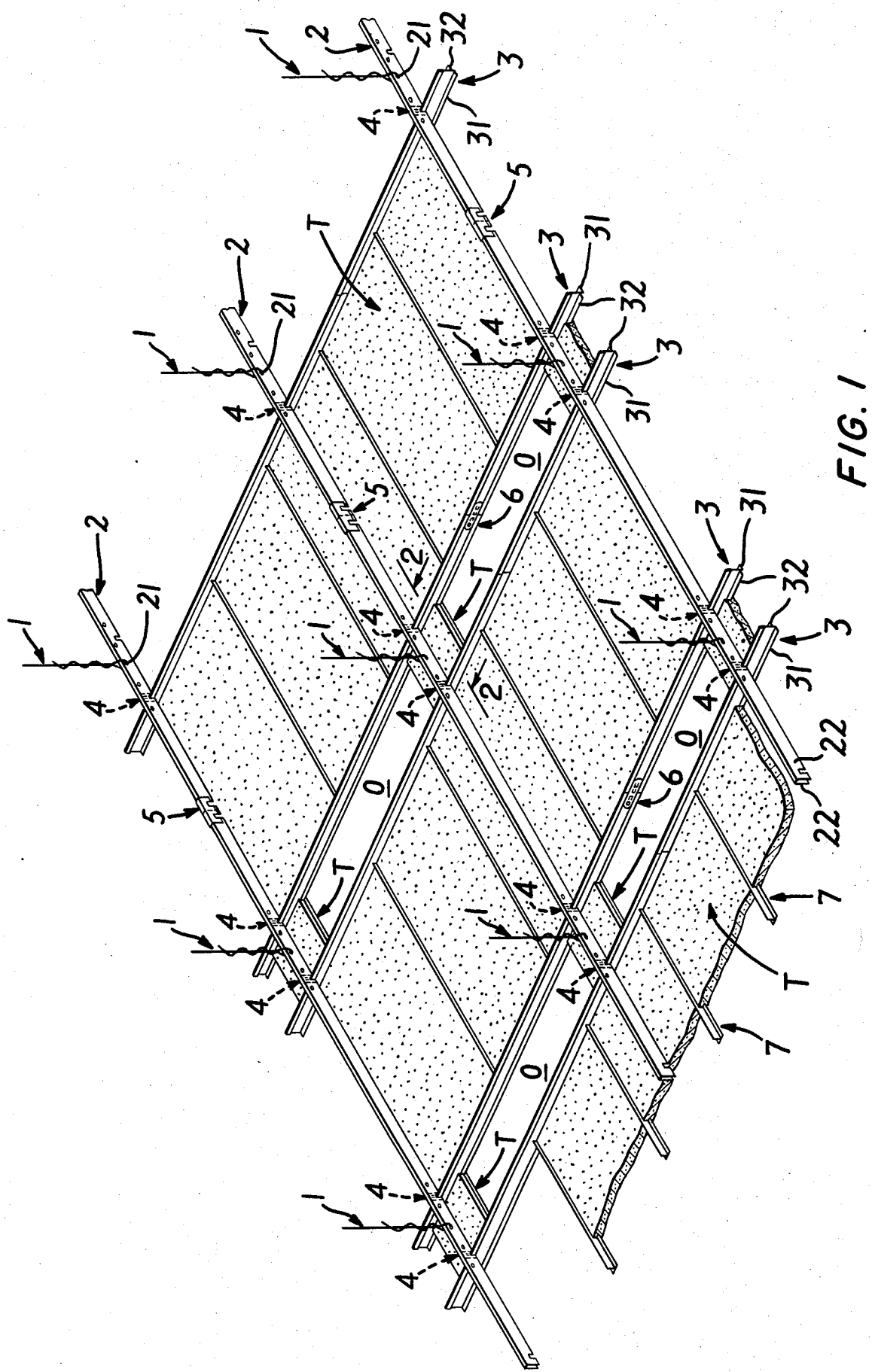
FIG. 1 is a perspective view from above of the drop-ceiling support system.

The various component elements or members and features of the drop-ceiling support system of the present invention include hanger members 1 (FIGS. 1, 2, 7A-7C, 8), carrier channel members 2 (FIGS. 1, 2, 3A, 3B, 5C, 5D, 7C), main runner members 3 (FIGS. 1, 2, 6C-6E), latch spring members 4 (FIGS. 1, 2, 4A-4C), carrier channel coupler members 5 (FIGS. 1, 5A-5D) and main runner splice members 6 (FIGS. 1, 6A-6E).

Referring first to FIG. 1, the drop-ceiling support system of the present invention is suspended by hanger members 1 which are attached to and extend downwardly from an original ceiling (not shown) and which are arranged at aligned appropriately spaced intervals along parallel rows. As shown in FIG. 1, the hanger members 1 can be in the form of hanger wires 1, but preferably they are in the form of hanger clips 1 as shown in FIGS. 7 and 8 (which are discussed hereinafter).

Inverted U-shaped carrier channel members 2 adjoined end-to-end in appropriately spaced parallel rows are attached to the hanger members 1. As shown in FIG. 1 (and FIG. 2), the carrier channel members 2 are attached to the hanger members 1 by passing the hanger wires 1 through appropriately spaced opposed holes 21 along the upper portions of the two legs 22 of the carrier channel members 2 and then twisting the hanger wires 1 around themselves.

Main runner members 3 adjoined end-to-end in appropriately spaced parallel rows transverse to the rows of carrier channel members 2 are snap-fitted from beneath into the carrier channel members 2. The main runner members 3 are at least longer than the spacing between the carrier channel members 2 and the carrier channel members 2 are at least longer than the spacing between the main runner members 3.

Also shown in FIG. 1 (in phantom lines) are the latch spring members 4 used in snap-fitting the main runner members 3 beneath and into the carrier channel members 2, the coupler members 5 for joining together the ends of abutting carrier channel members 2, splice members 6 for joining together the ends of abutting main runner members 3, large and small size acoustical ceiling tiles T supported by lower short flanges 31 and upper long flanges 32, respectively, of the main runner members 3 and openings 0 between adjacent parallel rows of main runner members 3 for insertion of lighting fixtures. FIG. 1 further shows auxiliary inverted T-shaped ceiling tile support or strengthening members 7 which are inserted into grooves along the opposite long edges of the large acoustical tiles T (and hence concealed in use) to further support or strengthen these large tiles in the lengthwise direction so as to prevent sagging of the tiles.

Figure 2:
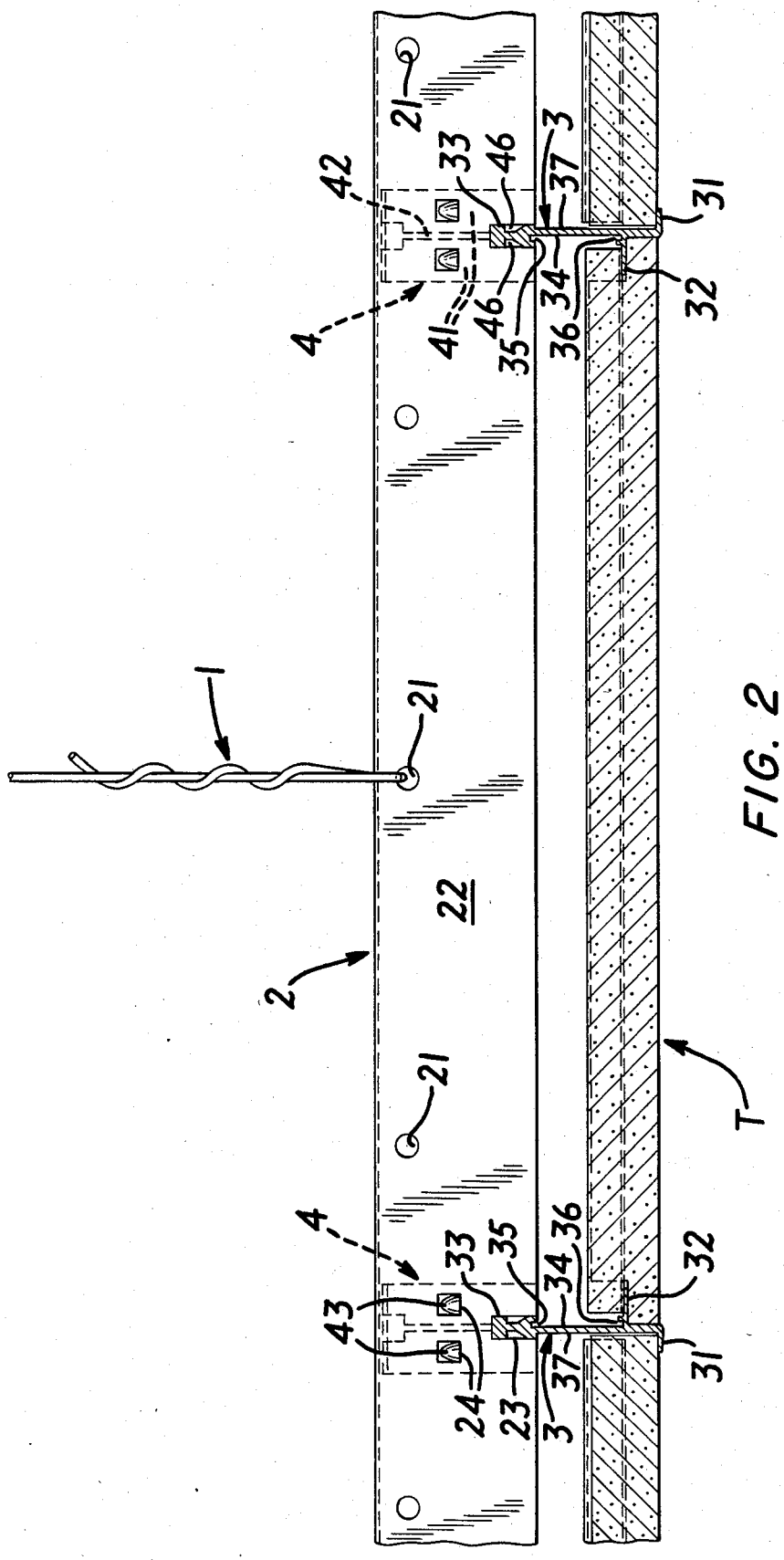
FIG. 2 is a cross-sectional view taken on line 2—2 of FIG. 1.

FIGS. 2, 3A and 3B show further details of the inverted U-shaped carrier channel members 2. These carrier channel members 2 have two vertical legs 22 with a series of opposed holes 21 running along the upper portion of each leg 22 through which the hanger wires 1 are passed. (When the hanger clip 1 shown either in FIGS. 7A-7C or in FIG. 8 is used to support the carrier channel members 2, these holes 21 can either be omitted or else not utilized.) Along the lower portions of the two legs 22 of the carrier channel members 2 there are spaced at appropriate intervals small opposed rectangular notches 23 having outward thereof two square holes 24 in opposed relationship in each leg 22. (The notches 23 in the carrier channel members 2 of a row are aligned with the notches 23 in the carrier channel members 2 of the other rows shown in FIG. 1) Adjacent the ends of each carrier channel member 2 there are larger precisely spaced opposed rectangular notches 25 in the lower portion of each leg 22. These larger notches 25 have an approximately 45° taper or bevel 26 at their entrance for ease of use with the coupler members 5. The small rectangular notches 23 and holes 24 are for use with the latch spring 4, while the larger rectangular notches 25 are for use with the coupler member 5. These carrier channel members 2 can be made, for example, of zinc-coated steel.

As shown in FIGS. 1, 2, 6C-6E, the main runner members 3 have a rectangular bulbous portion 33 extending along its upper edge which is engageable by and snap-fitted into the latch spring 4 housed at the pairs of opposed small rectangular notches 23 of the carrier channel members 2. The rectangular notch 23 in the carrier channel member 2 and the rectangular bulbous portion 33 of the main runner member 3 are sized to provide a close fit together, so that the notch 23 will restrain the main runner member 3 in a vertical position and prevent it tipping sideways which could cause the ceiling tiles T to fall off the supporting flange 31. The rectangular bulbous portion 33 of the main runner members 3 has lateral lengthwise clefts 38 whose purpose or function is set forth hereinafter. One face 34 of the main runner member 3 has a pair of opposed grooves 35, 36 extending lengthwise beside the face 34. The upper groove 35 is located below the rectangular bulbous portion 33, while the lower groove 36 is located on the upper long right angle flange 32. These two grooves 35, 36 serve for engagement with the main runner splicing device 6 as explained hereinafter. Running along the lower edge of each main runner member 3 there is a lower short right angle flange 31 extending outwardly from the other face 37, which flange 31 serves for engagement support of large tile members T. As shown in FIG. 1, the main runner members 3 of two adjacent rows are snap-fitted into the carrier channel members 2 in such a manner that the upper flanges 32 are facing each other, while in the next two adjacent rows, the lower flanges 31 face one another. By this alternating flange-facing arrangement, the large acoustical tiles T are supported at their ends by the lower flanges 31 of adjacent rows of main runner members 3, while the small acoustical tiles T are suported by the upper flanges 32 of adjacent rows of the main runner members 3. The main runner members 3 can be formed, for example, from extruded aluminum and painted white, since the lower flange 31 is visible in the finished drop-ceiling.

Figure 4C:
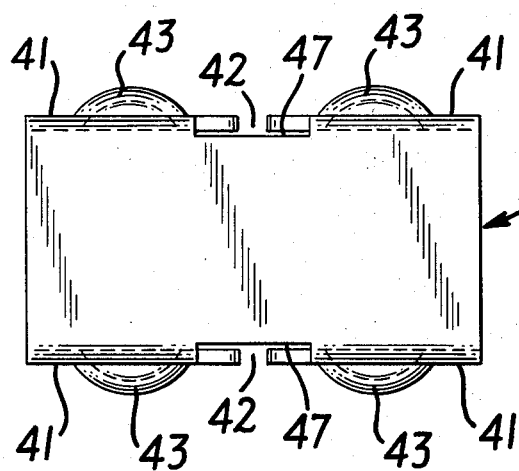
FIG. 4C is a top view of the latch spring.
Figure 4A:
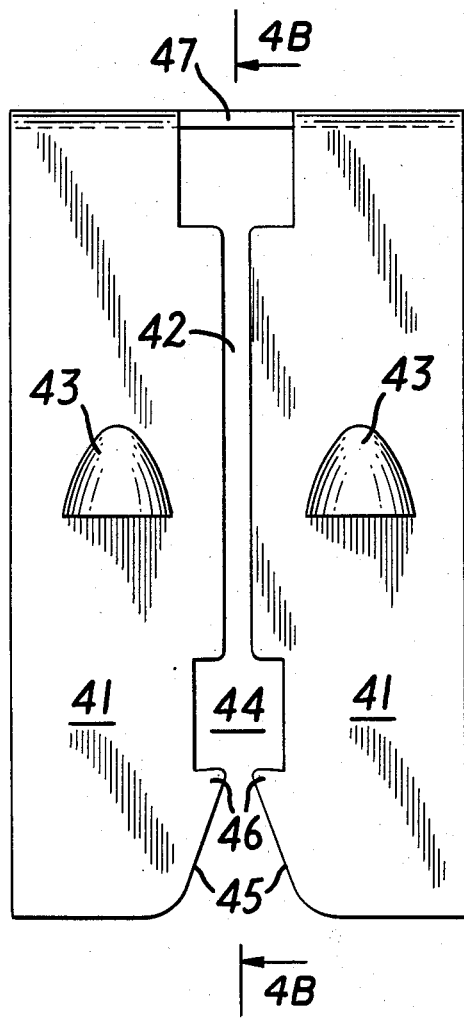
FIG. 4A is a side view of the latch spring.
Figure 4B:
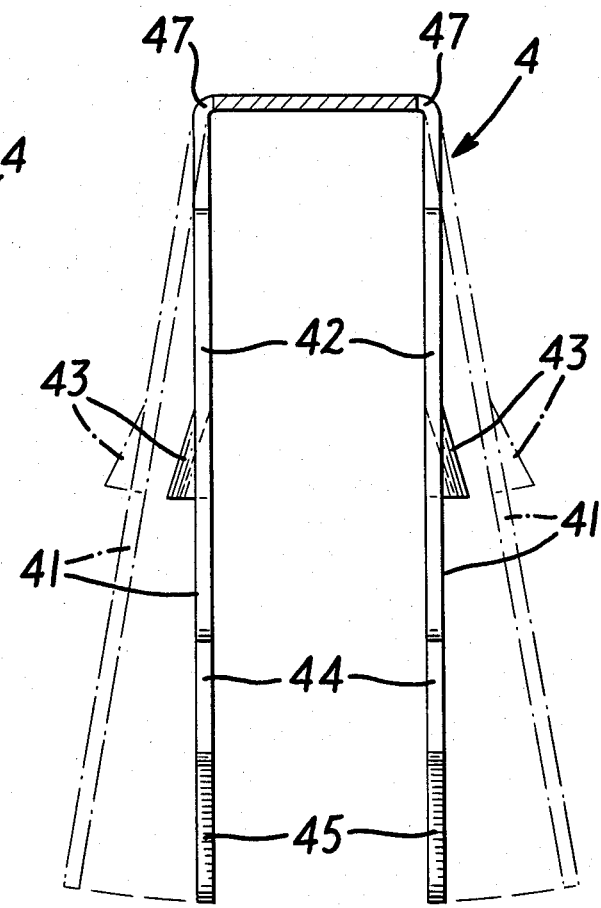
Figure 6A:
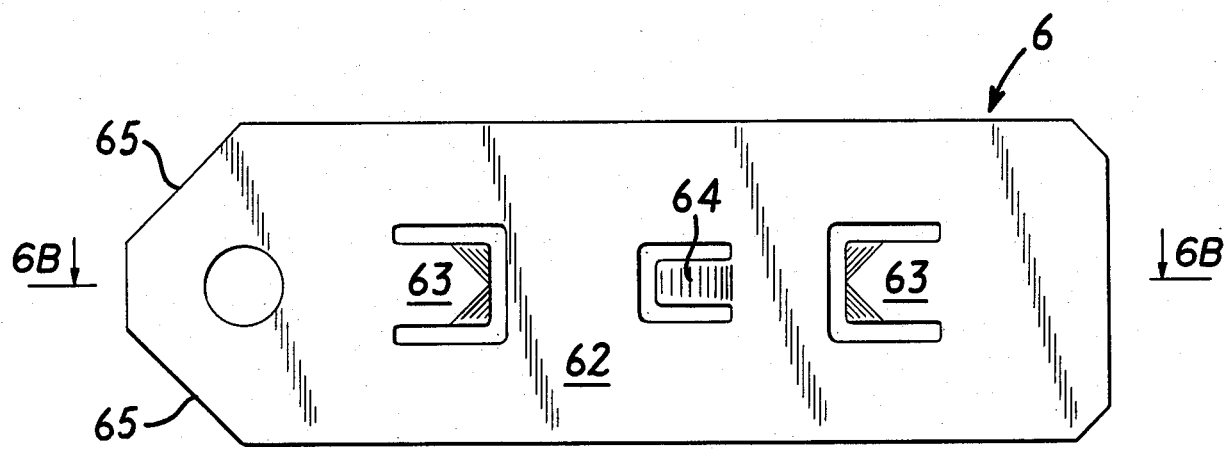
FIG. 6A is a side view of the main runner splice.
Figure 6B:
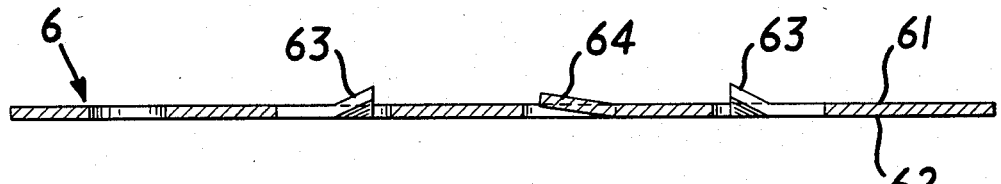
FIG. 6B is a top sectional view of the main runner splice taken on line 6B—6B of FIG. 6A, and FIGS. 6C, 6D and 6E are a side view, a top sectional view, and an end sectional view, respectively, of spliced main runners.
Figures 6C, 6E:
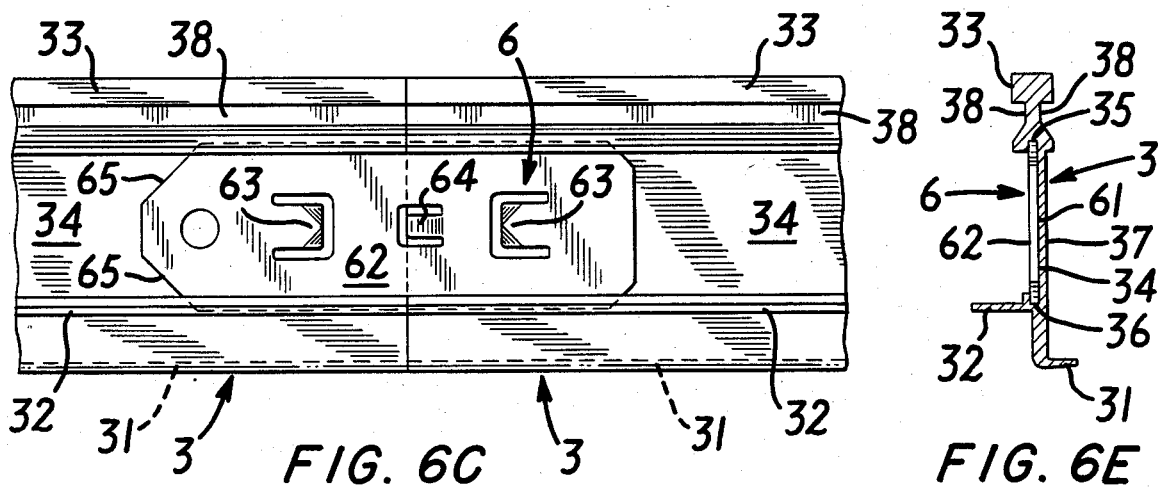
Figure 6D:
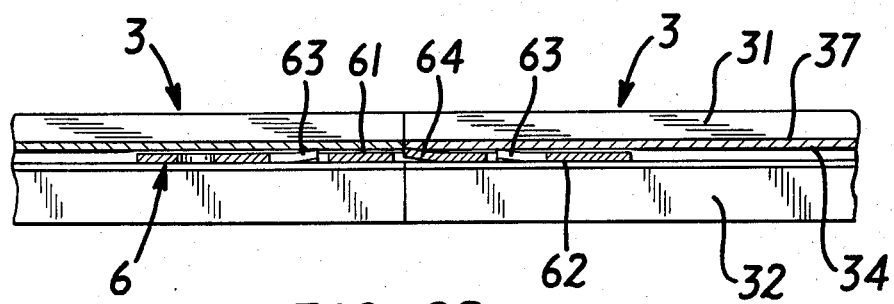

FIGS. 4A-4C show further details of the latch spring 4. Each latch spring 4 has two initially outwardly inclined laterally flexible legs 41 and a vertical split 42. Each leg 41 has two downwardly inclined and outwardly extending fingers 43. Each vertical split 42 has a slot 47 at the top and a recess 44 with prongs 46 thereberneath near the lower end. The vertical split 42 and the slot 47 impart slight end-to-end flexibility to the snap-fitted latch spring 4. As shown in FIG. 2, when the latch spring 4 is snap-fitted into a carrier channel member 2, the fingers 43 engage the square holes 24 of the carrier channel member 2, while the prongs 46 serve for locking engagement with the clefts 38 in the rectangular bulbous portion 33 of the main runner member 3 whose ingress is aided by the tapering 45. As shown in FIG. 4B by the phantom lines, the latch spring 4 is initially outwardly inclined at an angle of about 4°-8° and after insertion into the carrier channel member 2 the two legs 41 of the latch spring 4 then have a vertical configuration. The latch spring 4 can be made, for example, of heat-treated, spring temper, zinc-plated steel.

FIGS. 5A-5D show further details of the coupler member 5 for the carrier channel members 2 as well as two coupled carrier channel members 2. The coupler member 5 has an inverted U-shape with two legs 51, 52. There are two precisely spaced bendable tabs 53 in the lower portion of one leg 51 and opposed notches 54 in the other leg 52. The coupler member 5 is fitted down from the top over the ends of adjoining carrier channel members 2 and then each tab 53 is bent 90° for engagement into the pairs of precisely spaced opposed notches 25 of adjoining carrier channel members 2 and into the opposed notch 54 in the other leg 52 of the coupler member 5. The precise spacing of the bendable tabs 53 and the precise spacing of the opposed notches 25 are calculated so that a long succession of carrier channel members 2 connected to each other by coupler members 5 will maintain a precise predetermined usually modular spacing between notches 23 and therefore between main runners 3 over the entire length of a building without an accumulation of error of significant degree. Bending of the tabs 53 at the exact point desired is assisted by a weakening hole 55 at the base thereof. The coupler member 5 can be made, for example, of zinc-coated steel. Of course, the number of tabs 53 and notches 54 in the coupler member 5 can be increased (with a corresponding increase in the number of notches 25 in the carrier channel members 2) for higher strength coupling.

The main runner splice 6 as well as two spliced abutting main runners 3 are shown in FIGS. 6A-6E. The main runner splice 6 is a flat sheet having two faces 61, 62. The face 61 has two oppositely pointing barbs 63 and an intermediate centering tab 64, each of which extends slightly outwardly from the face 61. The width and thickness of the splice member 6 substantially correspond to the width and spacing, respectively, of the grooves 35, 36 of the main runner members 3. The splice member 6 is slid or inserted into the opposed grooves 35, 36 at the ends of two abutting main runner members 3. After insertion, one barb 63 each frictionally engages the face 34 of the adjoining main runner member 3. The splice member 6 can have a lengthy taper or bevel 65 of about 45° at one end so as to indicate to the installer that this is the first end which is to be inserted into the opposed grooves 35, 36 of a main runner member 3 and further so that the intermediate centering tab 64 then is arrested by butting against the end of that main runner member 3 to locate centrally the splice member 6 between the ends of two main runner members 3 to be spliced. After splicing, the outwardly extending centering tab 64 is thereby forced into alignment with the face 61 of the splice member 6 which touches the same faces 34 of the spliced main runner members 3. The main runner splice 6 can be made, for example of heat-treated, spring temper, zinc-plated steel so that the two barbs 63 are in strong frictional engagement with the faces 34 of the spliced softer extruded aluminum main runner members 3.

Figure 7A:
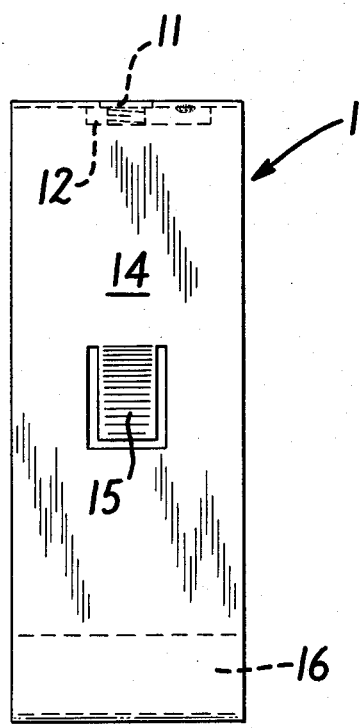
Figure 7B:
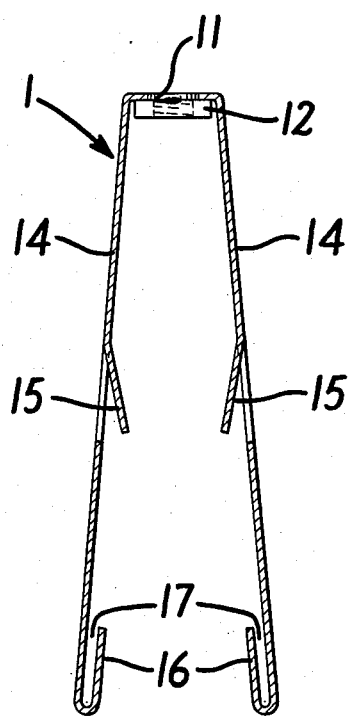
Figure 7C:
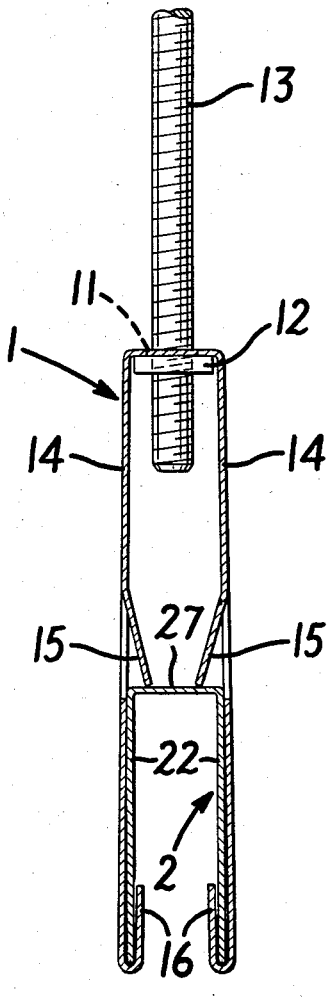
FIG. 7C is an end view of such hanger clip holding the carrier channel.
Figure 8:
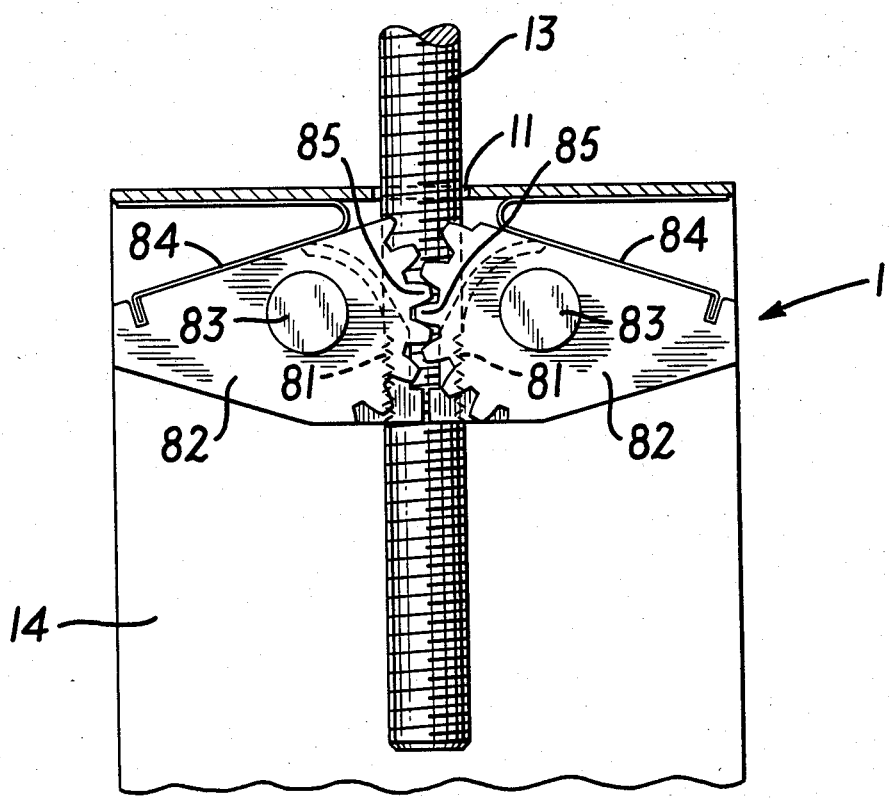
FIG. 8 is a partial sectional side view of the upper portion only of another carrier channel hanger clip.

A hanger clip member 1 for the carrier channel member 2 is shown in FIGS. 7A-7C. This hanger clip 1 has a hole 11 in the top with a nut 12 mounted by welding below the hole 11 for threaded engagement with a threaded rod 13 attached to the original ceiling. The hanger clip 1 further has two initially outwardly inclined and downwardly extending legs 14 with an inwardly bent tab 15 in each leg 14. The hanger clip 1 also has two inwardly bent and upwardly extending lower ends 16 forming grooves 17 for receipt of two legs 22 of the inverted U-shaped carrier channel member 2. The distance between the free ends of the tabs 15 and the bottoms of the grooves 17 substantially corresponds to the height of the legs 22 of the carrier channel member 2. The two legs 14 of the hanger clip 1 are initially inclined outwardly at an angle of about 5° from the vertical as shown in FIG. 7B. The carrier channel 2 is inserted upwardly into the open lower end of the hanger clip 1 and through the gap between the bent tabs 15 and then the legs 22 are dropped down into the grooves 17 by hand compressing the resilient legs 14 of the hanger clip 1 together. The free ends of the two tabs 15 (bent inwardly at an angle of about 15°) now engage the top 27 of the carrier channel 2 and prevent vertical movement upwardly of the carrier channel 2.

The hanger clip member 1, whose upper portion only is shown in FIG. 8, is the same as the hanger clip member 1 shown in FIGS. 7A-7C except for its means of connection to the threaded rod 13 attached to the original ceiling. Thus, the hanger clip 1 of FIG. 8 is in threaded engagement with the threaded rod 13 via laterally inner threads 81 on opposed rocker arms 82 mounted on pivot pins 83 attached to legs 14 (only one leg is shown) below the hole 11. The rocker arms 82 are spring-loaded by leaf springs 84 and have laterally outer intermeshing gear teeth 85. The hanger clip 1 of FIG. 8 is shoved up through its hole 11 onto the threaded rod 13 which causes pivoting of the rocker arms 82 about the pivot pins 83 and rotation of the intermeshing gear teeth 85 while compressing the leaf springs 84. When the shoving is stopped, the compressed leaf springs 84 cause reverse rotation of the intermeshing gear teeth 85 and locking engagement of the threads 81 with the threaded rod 13.

The drop-ceiling support system of the present invention as well as the ceiling tiles and lighting fixtures supported thereby is assembled in the following fashion. The hanger members 1 are attached in a conventional manner to an original ceiling and arranged at aligned intervals along parallel rows. The carrier channel members 2 are then hung or suspended in parallel rows from the hanger members 1. The ends of adjoining carrier channel members 2 are connected together by means of the coupler members 5. The latch springs 4 are snap-fitted into the carrier channel members 2 either before or after the carrier channel members 2 are hung from the hanger members 1, but in practice this insertion will usually be done in the factory where the component elements or members of the ceiling support system are manufactured rather than at the job-site. The main runner members 3 are spliced together by the splice members 6 and then snap-fitted from below into the latch springs 4 housed in the carrier channel members 2, care being taken as to the alternating orientation of the flanges 31, 32 of adjacent rows of main carrier members 3. Ceiling tiles T are thereafter laid into or upon the flanges 31, 32 of the main runner members 3. Auxiliary inverted T-shaped ceiling tile support or strengthening members 7 are inserted into the grooves in the large tiles T as each large tile T is installed. Lighting fixtures are emplaced in the lighting fixture openings O.

The drop-ceiling support system of the present invention is strongly and rigidly maintained in all directions by means of the hanger clips which interlock with the carrier channel members, by means of the coupler members which interlock with adjoining carrier channel members, by means of the splice members which interlock with adjoining main runner members and by means of the latch springs which interlock the main runner members into the carrier channel members. Also the interlocking of the various members of the system prevents twisting or distortion of the members after installation and insures appropriate spacing of the members and the supported ceiling tiles and lighting fixtures.

The drop-ceiling support system of the present invention is a support system which is easily, rapidly and inexpensively installed by hand without the need for special tools; which maintains accurate spacing over long distances without requiring measurements or installation jigs; which is unobtrusive in appearance from below; and which does not intrude into the area alongside the lighting fixture that should be kept clear to maximize air delivery from a fixture-attached air boot.

What is claimed is:

1. A drop-ceiling support system for supporting ceiling tiles and lighting fixtures which comprises
    hanger members attached to and extending downwardly from an original ceiling and arranged at aligned intervals along parallel rows,
    inverted U-shaped carrier channel members adjoined end-to-end in parallel rows and attached to the hanger members, and
    main runner members adjoined end-to-end in parallel rows transverse to the rows of carrier channel members and snap-fitted beneath and into the carrier channel members;
    each main runner member has a rectangular bulbous portion extending along its upper edge,
    each carrier channel member has pairs of opposed rectangular notches arranged at intervals in the lower portion of its two legs and latch springs housed at each pair of opposed rectangular notches,
    the rectangular notches in the carrier channel members of a row being aligned with the rectangular notches in the carrier channel members of the other rows, and
    the rectangular bulbous portions of the main runner members are snap-fitted into the latch springs housed at the opposed rectangular notches in the carrier channel members.

2. A drop-ceiling support system according to claim 1 wherein
    the rectangular bulbous portion of each main runner member has lateral lengthwise clefts, and
    each latch spring has prongs which snap-fit with said clefts.

3. A drop-ceiling support system according to claim 1 wherein
    each carrier channel member has a pair of opposed holes in each leg outward of each pair of opposed rectangular notches,
    each latch spring has two initially outwardly inclined and vertically split legs with two downwardly inclined and outwardly extending fingers in each leg, and
    each latch spring is snap-fitted into the carrier channel member by engagement of the fingers with the holes.

4. A drop-ceiling support system according to claim 1 wherein
    each carrier channel member has a pair of precisely spaced opposed notches in the lower portion of its two legs adjacent each end,
    an end of each carrier channel member is coupled to an end of an adjoining carrier channel member by an inverted U-shaped coupler member having two legs, and
    the coupler member is fitted down from the top over the ends of the adjoining carrier channel members and has two precisely spaced bendable tabs in the lower portion of one leg and opposed notches in the other leg, each tab being bent for engagement into the pairs of precisely spaced opposed notches of the adjoining carrier channel member and into the opposed notch in the other leg of the coupler member.

5. A drop-ceiling support system according to claim 1 wherein
    each main runner member has a face with a pair of opposed grooves extending lengthwise beside the face,
    an end of each main runner member is spliced to an end of an adjoining main runner member by a flat splice member, and
    the splice member is slid into the opposed grooves at the ends of the adjoining main runner members and has two oppositely pointing barbs and an intermediate centering tab extending slightly outwardly from one of its faces, one barb each for frictional engagement with a face of the adjoining main runner member.

6. A drop-ceiling support system according to claim 1 wherein each hanger member is a hanger clip having
    means for threaded engagement with a threaded rod attached to the original ceiling,
    two initially outwardly inclined and downwardly extending legs with an inwardly bent tab in each leg, and
    two inwardly ben and upwardly extending lower ends forming grooves for receipt of the two legs of the inverted U-shaped carrier channel member.

7. A drop-ceiling support system according to claim 6 wherein said means is a nut mounted below a hole in the top of the hanger clip.

8. A drop-ceiling support system according to claim 7 wherein said rocker arms have intermeshing gear teeth.

9. A drop-ceiling support system according to claim 6 wherein said means is opposed threaded spring-loaded pivotable rocker arms mounted below a hole in the top of the hanger clip.

* * * * *